United States Patent
Park et al.

(10) Patent No.: US 7,269,776 B2
(45) Date of Patent: Sep. 11, 2007

(54) APPARATUS AND METHOD FOR PERFORMING BIT DE-COLLECTION IN A COMMUNICATION SYSTEM USING A HIGH SPEED DOWNLINK PACKET ACCESS (HSDPA) SCHEME

(75) Inventors: Dong-Wook Park, Suwon-si (KR); Joo-Kwang Kim, Yongin-si (KR); Jung-Hwan Rim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 391 days.

(21) Appl. No.: 10/989,557

(22) Filed: Nov. 17, 2004

(65) Prior Publication Data
US 2005/0166119 A1 Jul. 28, 2005

(30) Foreign Application Priority Data
Nov. 18, 2003 (KR) .................. 10-2003-0081393

(51) Int. Cl.
*H03M 13/00* (2006.01)
(52) U.S. Cl. .................. 714/752; 714/702; 714/768; 714/786
(58) Field of Classification Search .......... 714/752, 714/786, 702, 768
See application file for complete search history.

(56) References Cited

U.S. PATENT DOCUMENTS 6,744,744 B1 * 6/2004 Tong et al. .................. 370/320
6,854,077 B2 * 2/2005 Chen et al. .................. 714/702

* cited by examiner

*Primary Examiner*—Guy Lamarre
*Assistant Examiner*—Esaw Abraham
(74) *Attorney, Agent, or Firm*—Roylance, Abrams, Berdo & Goodman, LLP

(57) ABSTRACT

An apparatus and a method for performing a bit de-collection according to a hybrid automatic retransmission request are disclosed. The apparatus includes a column counter for increasing one column every four bits and outputting a position of a current column in response to received bit sequences; a state detector for outputting state information of the current column by means of an output value of the column counter, a parameter denoting a number of rows to which systematic bits have been assigned, and a parameter denoting a number of columns to which the systematic bits have been assigned; and address generators for generating write addresses required for performing a write operation and read addresses required for performing a read operation according to the state information output from the state detector.

15 Claims, 9 Drawing Sheets

| | | ColCNT <= NC − 1 | NC > 0 / ColCNT > NC − 1 | NC = 0 |
|---|---|---|---|---|
| NR + 1 | 1 | NC[0] = 0 | ColCnt[0] = 0 : (S, P2, P1, P2)<br>ColCnt[0] = 1 : (S, P1, P2, P1) | ColCnt[0] = 0 : (P2, P1, P2, P1)<br>ColCnt[0] = 1 : (P2, P1, P2, P1)<br>ColCnt[0] = 0 : (P1, P2, P1, P2)<br>ColCnt[0] = 1 : (P1, P2, P1, P2) | |
| | 2 | NC[0] = 0 | (S, S, P2, P1) | ColCnt[0] = 0 : (S, P2, P1, P2)<br>ColCnt[0] = 1 : (S, P1, P2, P1)<br>ColCnt[0] = 0 : (S, P2, P1, P2)<br>ColCnt[0] = 1 : (S, P1, P2, P1) | |
| | 3 | NC[0] = 1 | ColCnt[0] = 0 : (S, S, S, P2)<br>ColCnt[0] = 1 : (S, S, S, P1) | (S, S, P2, P1) | |
| | 4 | NC[0] = 0 | (S, S, S, S) | (S, S, P1, P2) | |
| | | NC[0] = 1 | | ColCnt[0] = 0 : (S, S, S, P2)<br>ColCnt[0] = 1 : (S, S, S, P2)<br>ColCnt[0] = 0 : (S, S, S, P1)<br>ColCnt[0] = 1 : (S, S, S, P1) | |
| NR | 1 | | | | ColCnt[0] = 0 : (S, P2, P1, P2)<br>ColCnt[0] = 1 : (S, P1, P2, P1) |
| | 2 | | | | (S, S, P2, P1) |
| | 3 | | | | ColCnt[0] = 0 : (S, S, S, P2)<br>ColCnt[0] = 1 : (S, S, S, P1) |
| | 4 | | | | (S, S, S, S) |

FIG. 6

APPARATUS AND METHOD FOR PERFORMING BIT DE-COLLECTION IN A COMMUNICATION SYSTEM USING A HIGH SPEED DOWNLINK PACKET ACCESS (HSDPA) SCHEME

PRIORITY

This application claims the benefit under 35 U.S.C. 119(a) of an application entitled "Apparatus And Method For Performing Bit De-collection In Communication System Using HSDPA Scheme" filed in the Korean Intellectual Property Office on Nov. 18, 2003 and assigned Serial No. 2003-81393, the entire contents of which are incorporated herein by reference.

BACKGROUND OF THE INVENTION

1. Field of the Invention

The present invention relates to a communication system using a high speed downlink packet access ('HSDPA') scheme. More particularly, the present invention relates to an apparatus and a method for performing bit de-collection according to a hybrid automatic retransmission request ('HARQ').

2. Description of the Related Art

Voice data-centered mobile communication systems have evolved into wireless data packet communication systems providing data service and multimedia service of high quality at a high speed. Current standardization on a high speed downlink packet access (HSDPA) and a First Evolution Data Only (1xEV-DO) system progressed mainly by the 3GPP and the 3GPP2 is made by a representative effort to find out a solution for a high quality wireless data packet transmission service of high speed more than 2 Mbps in the 3G mobile communication system. The 4G mobile communication system has been developed with the aim of providing a high quality multimedia service of speed higher than that of the 3G mobile communication system.

Generally, the HSDPA scheme is the general term for a data transmission scheme including a high speed-downlink shared channel ('HS-DSCH'), which is a downlink data channel, and control channels relating to the HS-DSCH for supporting high speed downlink packet data transmission in a universal mobile terrestrial system (UMTS) communication system. To support the HSDPA, an adaptive modulation and coding ('AMC') and a HARQ have been proposed.

In relation to the support of the HSDPA, the HARQ scheme denotes a predetermined link control scheme used for retransmitting a data packet to compensate for a data packet including an error when the error has occurred in the initially transmitted data packet. The HARQ scheme may be classified into a chase combining ('CC') scheme, a full incremental redundancy ('FIR') scheme and a partial incremental redundancy ('PIR') scheme.

The CC scheme is a scheme of simply retransmitting the same data packet as that which included an error in an initial transmission. A receiver combines the retransmitted data packet and the initially transmitted data packet having been stored in a reception buffer, thereby improving the reliability for a coding bit input to a decoder. Therefore, the entire performance gain of a system can be obtained. Herein, combining the same two data packets (i.e., the initially transmitted data packet and the retransmitted data packet) causes an effect similar to that of a repetition coding. Therefore, average performance gain effects of about 3 dB can be obtained.

The FIR scheme does not retransmit the same data packet as that including the error in the initial transmission, but transmits a data packet including only a redundancy bit generated in a channel coder. Therefore, the performance of the decoder in the receiver can be improved. That is, in decoding, the decoder uses not only information received in the initial transmission but also a recently received redundancy bit, thereby reducing a coding rate. Therefore, the performance of the decoder is improved.

Meanwhile, a transmission side of a node B does not differentiate a systematic bit from a parity bit which are data to be transmitted by means of the HARQ, but serializes and transmits the systematic bit and the parity bit. That is, the transmission side performs a bit collection for the systematic bit and the parity bit and transmits them to a reception side.

Then, the reception side must divide the input serialized data into the systematic bit and the parity bit. This is referred to as bit de-collection.

That is, a HARQ bit de-collection block receives a bit sequence deinterleaved according to each physical channel, divides the bit sequence into a systematic bit, a parity bit 1 and a parity bit 2, and sends the systematic bit, the parity bit 1 and the parity bit 2 to an inverse-rate matching block. Herein, the bit de-collection block includes a buffer and sequentially processes data received through each physical channel. Accordingly, the buffer has a capacity capable of storing all data received through the physical channel. For instance, one transport channel block can use 10 physical channels at a maximum in case of a HSDPA category 7. The sort of transport channel used by a user equipment ('UE') is classified into categories 1 to 10 according to the quantity of service data supporting the HSDPA. In the case of the category 7, 1400 bits at a maximum and about 7.2 Mbps can be processed during one transmission time interval ('TTI') of 2 ms. Further, in the case of the category 7, a UE must store the maximum number (i.e., 19200 bits) of bits for each TTI in order to combine retransmitted bits.

Herein, since each bit is expressed by a soft value of a 8Q-level, a bit de-collection buffer for storing the 19200 bits has a size of 8 (Q-level)×4 (row)×4800 (column)=153.6K. Hereinafter, a general bit de-collection buffer will be described with reference to FIG. 1.

FIG. 1 is a diagram illustrating the structure of the conventional bit de-collection buffer.

Referring to FIG. 1, the bit de-collection buffer sequentially inputs a deinterleaved bit sequence by four bits through a deinterleaver and performs a bit de-collection by the column. The buffer includes a parameter NROW representing the number of available rows and a parameter NCOL representing the number of available columns. Further, the buffer separately stores a systematic bit, a parity bit 1 and a parity bit 2, which are serialized and input, by means of a parameter NR representing the number of row occupied systematic and a parameter NC representing the number of column occupied systematic.

Herein, after performing the bit de-collection, the bit de-collection block outputs the bit sequence for which the bit de-collection has been performed to a rate matching block. If the rate matching block punctures a predetermined bit in matching the received bit sequences at a preset rate, the rate matching block repeats and outputs a bit, which is located at a puncture position, of the bit sequence output from the bit de-collection block. The repeated bit is subjected to a zero insertion in an input unit of the rate matching block. Accordingly, the address of an HARQ combination buffer storing the rate-matched bit sequence and the total number of the stored bits increase according to the number of bits punctured by the rate matching block. That is, the number of zero insertion bits increases according to the number of punctured bits and thus the total number of bits including the increased number of bits increases. Consequently, the number of addresses of the HARQ combination buffer also increases.

In contrast, when the rate matching block must repeat a predetermined bit in matching the received bit sequences at the preset rate, a combination occurs at a position at which the repetition is performed. Therefore, the entire number of addresses of the HARQ combination buffer and the number of stored bits are reduced as compared with the bit de-collection buffer.

FIG. 2 is a diagram illustrating a conventional process by which a systematic bit, a parity bit 1 and a parity bit 2 are assigned to a bit de-collection buffer.

Referring to FIGS. 2a to 2c, when a digital signal of two bits is transmitted according to a Quaternary Phase Shift Keying (QPSK) scheme, different types of write operations are performed by the parameters NR, NC, NCOL and NROW. That is, the NCOL represents the number of available columns of the bit de-collection buffer and the NROW representing the number of available rows of the bit de-collection buffer. Further, since two bits are used according to a QPSK scheme, the NROW has a value of 2. Further, the value 10 of the NCOL is a value having been set for convenience of description.

FIG. 2a illustrates a case in which the NR has a value of 0 and the NC has a value of 6. That is, since the NR has a value of 0 and the NC has a value of 6, the systematic bits are assigned from a first column to a sixth column of a first row. Accordingly, the systematic bits are assigned to addresses of [0, 4, 8, 12, 16, 20], the parity bits 2 are assigned to addresses of [1, 9, 17, 24, 28, 32, 36] and the parity bits 1 are assigned to addresses of [5, 13, 21, 25, 29, 33, 37].

FIG. 2b illustrates a case in which the NR has a value of 1 and the NC has a value of 0. That is, since the NR has a value of 1 and the NC has a value of 0, the systematic bits are assigned to a first row. Accordingly, the systematic bits are assigned to addresses of [0, 4, 8, 12, 16, 20, 24, 28, 32, 36], the parity bits 2 are assigned to addresses of [1, 9, 17, 25, 33] and the parity bits 1 are assigned to addresses of [5, 13, 21, 29, 37].

FIG. 2c illustrates a case in which the NR has a value of 1 and the NC has a value of 4. That is, since the NR has a value of 1 and the NC has a value of 4, the systematic bits are assigned from a first column of a first row to a fourth column of a second row. Accordingly, the systematic bits are assigned to addresses of [0, 1, 4, 5, 8, 9, 12, 13, 16, 20, 24, 28, 32, 36], the parity bits 2 are assigned to addresses of [17, 25, 33] and the parity bits 1 are assigned to addresses of [21, 29, 37].

Meanwhile, referring to FIGS. 2d to 2f, when a digital signal of four bits is transmitted according to a 16 Quadrature Amplitude Modulation (QAM) scheme, different types of write operations are performed by the parameters NR, NC, NCOL and NROW. That is, according to a 16 QAM scheme, the NROW has a value of 4 and the NCOL is set to 10 for convenience of description.

FIG. 2d illustrates a case in which the NR has a value of 0 and the NC has a value of 6. That is, since the NR has a value of 0 and the NC has a value of 6, the systematic bits are assigned from a first column to a sixth column of a first row. Accordingly, the systematic bits are assigned to addresses of [0, 4, 8, 12, 16, 20], the parity bits 2 are assigned to addresses of [1, 3, 6, 9, 11, 14, 17, 19, 22, 24, 26, 28, 30, 32, 34, 36, 38] and the parity bits 1 are assigned to addresses of [2, 5, 7, 10, 13, 15, 18, 21, 23, 25, 27, 29, 30, 33, 35, 37, 39].

FIG. 2e illustrates a case in which the NR has a value of 1 and the NC has a value of 0. That is, since the NR has a value of 1 and the NC has a value of 0, the systematic bits are assigned to a first row. Accordingly, the systematic bits are assigned to addresses of [0, 4, 8, 12, 14, 16, 20, 24, 28, 32, 36], the parity bits 2 are assigned to addresses of [1, 3, 6, 9, 11, 14, 17, 19, 22, 25, 27, 30, 33, 35, 38] and the parity bits 1 are assigned to addresses of [2, 5, 7, 10, 13, 15, 18, 21, 23, 26, 29, 31, 34, 37, 39].

FIG. 2f illustrates a case in which the NR has a value of 1 and the NC has a value of 4. That is, since the NR has a value of 1 and the NC has a value of 4, the systematic bits are assigned from a first column of a first row to a fourth column of a second row. Accordingly, the systematic bits are assigned to addresses of [0, 1, 4, 5, 8, 9, 12, 13, 16, 20, 24, 28, 32, 36], the parity bits 2 are assigned to addresses of [2, 6, 10, 14, 17, 19, 22, 25, 27, 30, 33, 35, 38] and the parity bits 1 are assigned to addresses of [3, 7, 11, 15, 18, 21, 23, 26, 29, 31, 34, 37, 39].

As described above, the systematic bit, the parity bit 1 and the parity bit 2 are stored in the bit de-collection buffer by means of the parameters NR and NC. FIG. 3 shows the structure of hardware performing a read operation for the bit sequence (i.e., the systematic bit, the parity bit 1 and the parity bit 2) stored in the bit de-collection buffer.

FIG. 3 is a block diagram illustrating the structure of a conventional read address generator for performing a read operation and FIG. 4 is a diagram showing one example of a conventional bit de-collection buffer for which the read address generator of FIG. 3 performs a conventional read operation.

Referring to FIGS. 3 and 4, a number generator 301 generates addresses to which the received bit sequences are assigned in order to perform a read operation. That is, when the total 19200 bit sequences capable of being transmitted through one TTI are received, the number generator 301 generates 19200 read addresses.

The number generator 301 generates addresses of [0, 1, 4, 5, 8, 9, 12, . . . , 44, 45, 48, 49] to which the received bit sequences are assigned according to the bit de-collection buffer of FIG. 4. That is, the received bit sequences are assigned to the addresses of [0, 1, 4, 5, 8, 9, 12, . . . , 44, 45, 48, 49]. A MOD 303 outputs a signal for an input signal according to a corresponding modulation scheme. The output signal is 00, 01, 10 and 11 for one input bit. A current column checker 305 checks a current column during a read process. That is, the current column checker 305 performs a change to a new column each fourth address of the bit de-collection buffer and provides the position of the current column. In other words, the current column checker 305 increases (shifts) one column each fourth address and checks the current column.

An address detector 307 detects whether bits assigned to a current address are systematic bits, parity bits 1 or parity bits 2 by means of information on a row, to which the systematic bits can be maximally assigned according to a modulation scheme, from the MOD 303 and information on the current column from the current column checker 305. That is, the address detector 307 detects an address to which the systematic bits are assigned and addresses to which the parity bits 1 and the parity bits 2 are assigned by means of the parameters NR and NC and outputs the addresses to a multiplexer 309.

FIG. 4 illustrates a case in which the NR has a value of 1 and the NC has a value of 2. Since the NCOL has a value of 13 and the NROW (the number of rows capable of being maximally assigned according to a modulation scheme) has a value of 2, the systematic bits of the received bit sequences are assigned to addresses of [0, 1, 4, 5, 8, 12, 16, 20, 24, 28, 32, 36, 40, 44, 48], the parity bits 2 of the received bit sequences are assigned to addresses of [9, 17, 25, 33, 41, 49] and the parity bits 1 of the received bit sequences are assigned to addresses of [13, 21, 29, 37, 45].

The multiplexer 309 stores the addresses of [0, 1, 4, 5, 8, 12, 16, 20, 24, 28, 32, 36, 40, 44, 48] to which the systematic bits have been assigned in a register 311, stores the addresses of [13, 21, 29, 37, 45] to which the parity bit 1 has been assigned in a register 315, and stores the addresses of [9, 17, 25, 33, 41, 49] to which the parity bit 2 has been assigned in a register 313.

That is, the register 311 stores the addresses to which the systematic bits of the received bit sequences have been assigned, the register 313 stores the addresses to which the parity bit 1 of the received bit sequences have been assigned, and the register 315 stores the addresses to which the parity bit 2 of the received bit sequences have been assigned. The addresses of registers 311, 313 and 315 are multiplexed by multiplexer 317. Further, in performing the read operation, when a rate matching block performs a puncture for predetermined bits by a PUNC signal value, a Prev_REG 310 performs a read process by repeating and outputting the punctured bits from the multiplexer 319 which receives output signals from multiplexer 317 and Prev_REG 310.

For instance, when bits assigned to a first address and a fourth address are punctured, the read address generator repeats and generates the first address and the fourth address. Accordingly, the read address generator outputs addresses of [0, 1, 1, 4, 4, 5, 8, 12, 16, 20, 24, 28, 32, 36, 40, 44, 48] and performs a read operation. That is, even though the bits assigned to the first address and the fourth address are punctured, the read address generator repeats a previous bit to prevent an error from occurring.

A write address generator 321 sequentially inputs bit sequences, which have been deinterleaved by a deinterleaver (not shown), by four bits and performs a write operation. Herein, the bit sequences are classified into systematic bits, parity bits 1 and parity bits 2 by the bit de-collection parameters NR, NC, NCOL and NROW and written in corresponding addresses of the bit de-collection buffer. The process by which the corresponding bits are assigned to the corresponding addresses by each parameter is as described in FIG. 2.

When the read operation is performed as described above, the read address generator includes a separate register 311 for storing the addresses to which the corresponding systematic bits have been assigned. Further, the read address generator includes separate registers (registers 313 and 315) for storing the addresses to which the parity bit 1 and the parity bit 2 have been assigned.

Herein, since the maximum number of transmission bits transmitted for one TTI is 19200 bits, when one address of the bit de-collection buffer is stored in one register, the number of the addresses is 19200 at a maximum. Therefore, a 15 bit register capable of expressing 19200 addresses requires 19200 bits which is the total number of bits. Accordingly, the size of hardware increases and efficiency of power consumption decreases according to the increased size of the hardware.

SUMMARY OF THE INVENTION

Accordingly, the present invention has been made to solve the above-mentioned problems occurring in the prior art, and it is an object of the present invention to provide an apparatus and a method for differentiating states of systematic bits from those of parity bits and outputting the systematic bits and the parity bits in performing a bit de-collection in a mobile communication system.

It is another object of the present invention to provide an apparatus and a method for performing a bit de-collection without separate registers for storing read addresses in a mobile communication system.

In accordance with one aspect of the present invention, there is provided an apparatus and method comprising a column counter for increasing one column every four bits and outputting a position of a current column in response to received bit sequences; a state detector for outputting state information of the current column by means of an output value of the column counter, a parameter denoting a number of rows to which systematic bits have been assigned, and a parameter denoting a number of columns to which the systematic bits have been assigned; and address generators for generating write addresses required for performing a write operation and read addresses required for performing a read operation according to the state information output from the state detector.

BRIEF DESCRIPTION OF THE DRAWINGS

The above and other objects, features and advantages of the present invention will be more apparent from the following detailed description taken in conjunction with the accompanying drawings, in which:

FIG. 6 is a diagram illustrating states of bits according to a write operation and a read operation performed according to an embodiment of the present invention;

DETAILED DESCRIPTION OF THE PREFERRED EMBODIMENT

Hereinafter, an embodiment of the present invention will be described with reference to the accompanying drawings.

In the following description of the present invention, a detailed description of known functions and configuration incorporated herein will be omitted for conciseness.

The present invention proposes an apparatus and a method which do not use separate registers for storing addresses to which corresponding systematic bits, parity bits 1 and parity bits 2 are assigned.

Further, the present invention provides an apparatus and a method for differently assigning systematic bits, parity bits 1 and parity bits 2 to a bit de-collection buffer in response to received input bit sequences, checking the bit de-collection buffer according to each column, and checking corresponding addresses of the systematic bits, the parity bits 1 and the parity bits 2.

Figure 5:
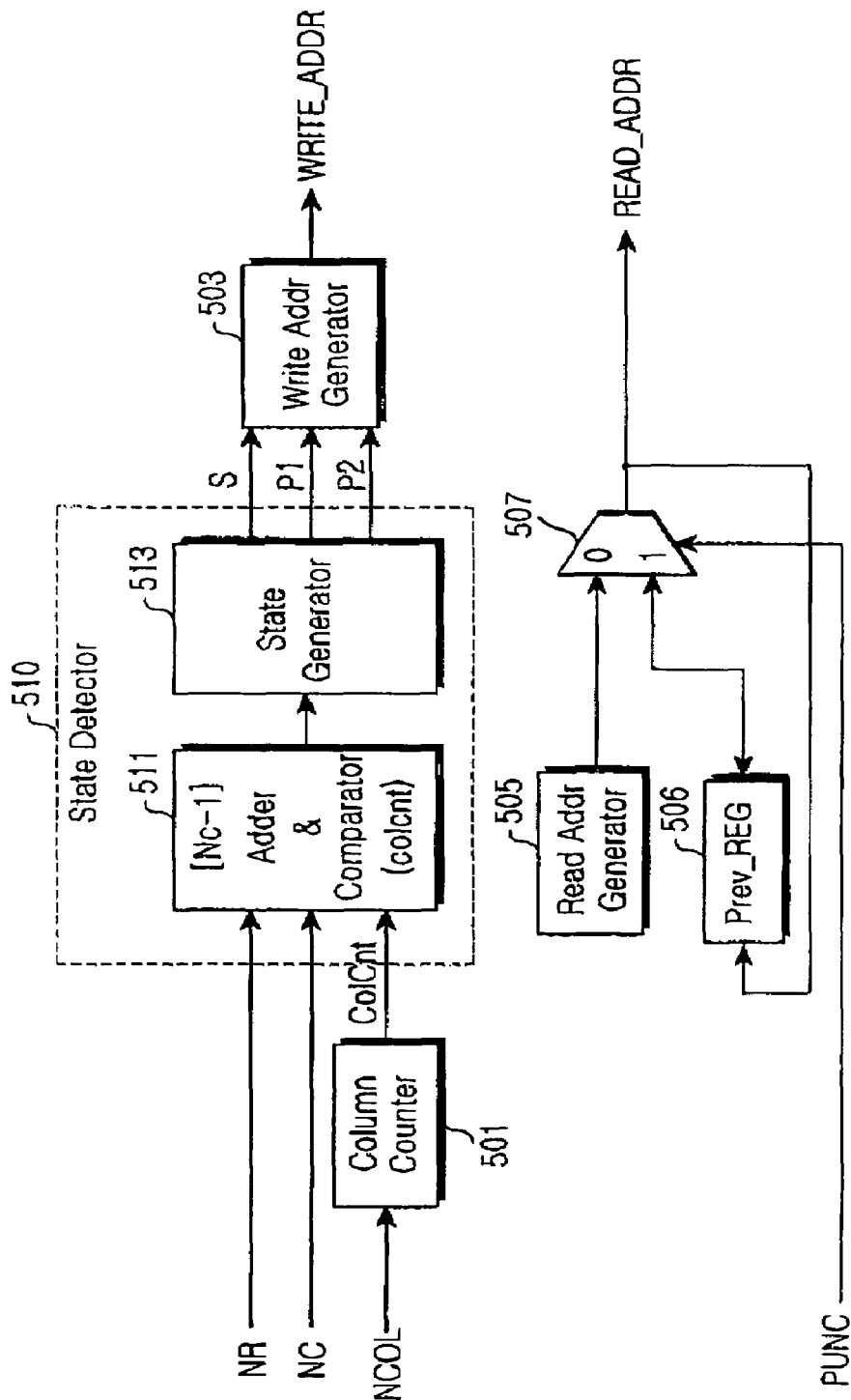
FIG. 5 is a block diagram illustrating a bit de-collection block performing a write/read process for a bit de-collection buffer according to an embodiment of the present invention.

FIG. 5 is a block diagram showing a bit de-collection block performing a write/read process for a bit de-collection buffer according to the embodiment of the present invention.

Referring to FIG. 5, the bit de-collection block for performing a write/read operation includes a column counter 501 for counting a column while increasing the column, a state detector 510, a write address generator 503 and a read address generator 505. The state detector 510 checks whether the state of an address for which a read operation is currently performed is a systematic bit, a parity bit 1 or a parity bit 2. The write address generator 503 checks an output state of the state detector 510 and generates a write address. The read address generator 505 checks an output state of the state detector 510 and generates a read address.

The column counter 501 receives bit sequences input from a deinterleaver (which is a previous block of the column counter 501) and increases (shifts) one column every four bits. Therefore, the column counter 501 counts a sequence to which a current column corresponds in response to the input bit sequences. Herein, an output value of the column counter 501 is expressed by a parameter ColCnt. Accordingly, whether a current column is an odd column or an even column is detected through the parameter ColCnt.

The state detector 510 includes an adder/comparator 511 and a state generator 513. The adder/comparator 511 receives applied parameters NR and NC and the parameter ColCnt and calculates a write address to which a systematic bit is to be assigned and a read address to which a parity bit 1 or a parity bit 2 is to be assigned. This will be described in detail with reference to FIG. 7.

When a bit output corresponding to the output value of the adder/comparator 511 is a systematic bit, the state generator 513 of the state detector 510 outputs a systematic bit and increases a write address. Further, when the output bit is a parity bit 1, the state generator 513 outputs a parity bit 1 and increases a write address of the parity bit 1. Further, when the output bit is a parity bit 2, the state generator 513 outputs a parity bit 2 and increases a write address of the parity bit 2.

Accordingly, in performing a write operation for the bit de-collection buffer, the write address generator 503 differently performs the write operation for each corresponding write address by means of the number of the systematic bits, the number of the parity bits 1 and the number of the parity bits 2. This may be expressed by equation 1

If state==S

DeColBufWriteAddr=SysWriteAddr;

else if state==P1

DeColBufWriteAddr=$P1$WriteAddr+Sys_Num;

else if state==P2

DeColBufWriteAddr=$P2$WriteAddr+Sys_Num+ $P1$_Num;   Equation 1

In equation 1, the DeColBufWriteAddr denotes a write address of the bit de-collection buffer, the SysWriteAddr denotes a write address of the systematic bit, the P1WriteAddr denotes a write address of the parity bit 1, and the P2WriteAddr denotes a write address of the parity bit 2. Further, the Sys_Num denotes the number of the systematic bits and the P1_Num denotes the number of the parity bits 1.

That is, when a state output from the state generator 513 is the systematic bit, the write address generator 503 sets the write address of the systematic bit as an initial write address of the bit de-collection buffer. That is, the write address of the bit de-collection buffer becomes the write address of the systematic bit. Further, when a state output from the state generator 513 is the parity bit 1, the write address generator 503 adds the write address of the parity bit 1 to the number (i.e., the number of initial write addresses of the bit de-collection buffer) of write addresses to which the systematic bits have been previously assigned, and sets the addition result as the write address of the bit de-collection buffer. Further, when a state output from the state generator 513 is the parity bit 2, the write address generator 503 adds the write address of the parity bit 2 to the number of addresses to which the systematic bits have been previously assigned and the number of addresses to which the parity bits 1 have been previously assigned, and sets the addition result as the write address of the bit de-collection buffer.

That is, the write address generator 503 outputs the states of the corresponding systematic bit, the parity bit 1 and the parity bit 2 by the column according to the parameter ColCnt output from the column counter 501 as well as the parameters NR and NC. Accordingly, the bit de-collection buffer receives the states of the systematic bit, the parity bit 1 and the parity bit 2 by the column and the write address generator 503 performs the write operation for the bit de-collection buffer.

Meanwhile, since the systematic bit, the parity bit 1 and the parity bit 2 are sequentially stored in divided areas of the bit de-collection buffer, the read address generator 505 performs a read operation while sequentially increasing the addresses of the buffer. Accordingly, the read address generator 505 does not have the necessity of including separate registers for storing read addresses in performing the read operation.

Figure 4:
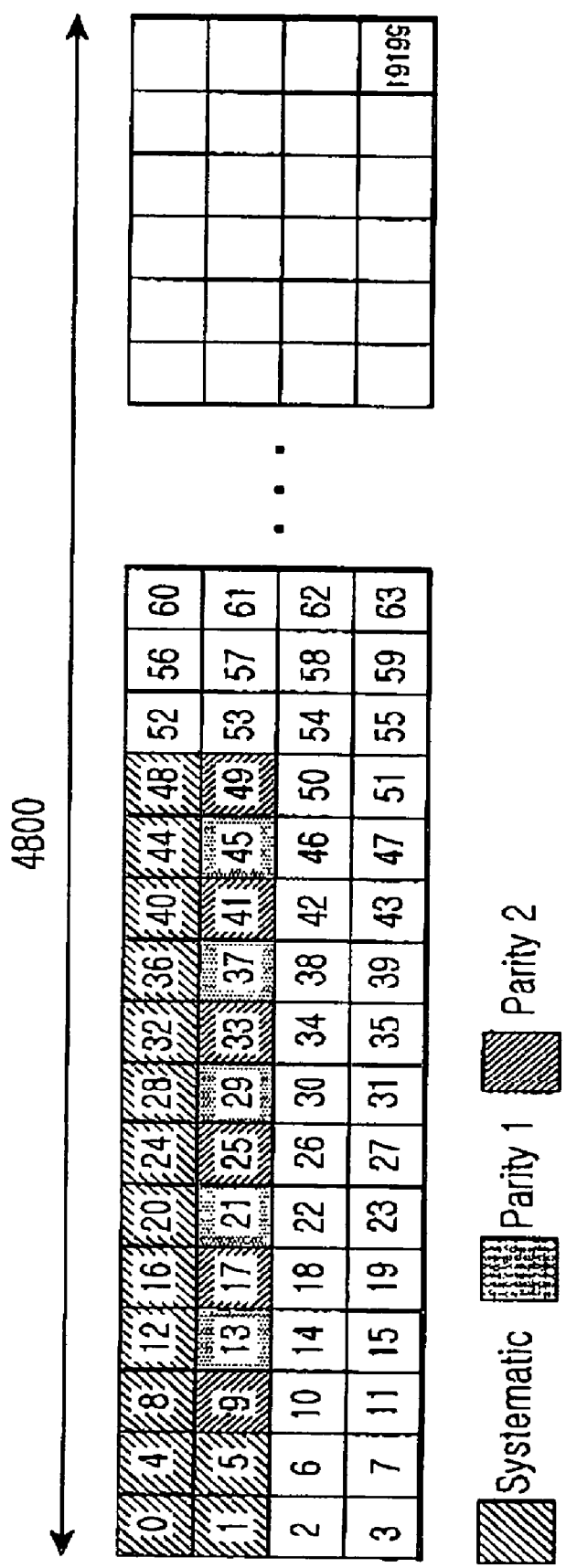
FIG. 4 is a diagram illustrating a conventional structure of a bit de-collection buffer corresponding to the maximum number of bits capable of being transmitted for one TTI.

In performing the read operation, when it is recognized that a rate matching block performs a puncture, that is, when a puncture signal is applied, the read address generator 505 repeatedly performs the read operation for a bit located at a position to be punctured and outputs the bit to a multiplexer 507 operating in conjunction with a Prev_REG 506 that repeats and outputs punctured bits from the multiplexer 507. This is as described in FIG. 4.

FIG. 6 is a diagram showing states of bits according to the write operation and the read operation performed by the scheme proposed in the present invention. FIG. 6 shows an example employing a case in which a modulation scheme is a 16 Quadrature Amplitude Modulation (QAM). The number of rows available in the bit de-collection buffer changes according to the modulation scheme. That is, when the modulation scheme used is 16 QAM, the number of available rows is four rows. Further, when the modulation scheme is a QPSK, the number of available rows is two rows.

Referring to FIG. 6, the NR+1 denotes the number of rows of addresses to which systematic bits have been assigned.

The ColCnt<NC-1 denotes a case in which a current column exists in columns to which the systematic bits have been assigned in response to a preset NC parameter. Herein, the ColCnt[0]=0 denotes a case in which the current column is located in the columns NC to which the systematic bits have been assigned and the current column is an odd column. In contrast, the ColCnt[0]=1 denotes a case in which the current column is located in the columns NC to which the systematic bits have been assigned and the current column is an even column. Meanwhile, the ColCnt>NC-1 denotes a case in which the current column exists in columns other than the columns to which the systematic bits have been assigned. Herein, the NC[0] denotes a case in which a preset value of the NC is an even column. In contrast, the NC[1] denotes a case in which the preset value of the NC is an odd column.

The following table 1 shows a case in which the NR+1 is 1 and the NC is an even (NC[0]=0) in FIG. 6. Herein, the ColCnt increases (shifts) one column every four bits and the arrow of table 1 denotes a write direction for states. That is, table 1 shows a case in which the NR is 0 and the NC is 4. In table 1, the states of the systematic bit, the parity bit 1 and the parity bit 2 at the ColCnt<NC-1 and the ColCnt[0]=0 are [S, P2, P1, P2]. Further, the states of the systematic bit, the parity bit 1 and the parity bit 2 at the ColCnt<NC-1 and the ColCnt[0]=1 (even column) are [S, P1, P2, P1]. In contrast, the states of the systematic bit, the parity bit 1 and the parity bit 2 at the ColCnt>NC-1 and the ColCnt[0]=0 are [P2, P1, P2, P1] and the states of the systematic bit, the parity bit 1 and the parity bit 2 at the ColCnt>NC-1 and the ColCnt[0]=1 are [P2, P1, P2, P1].

That is, the states at odd columns in four columns are [S, P2, P1, P2] and the states at even columns in four columns are [S, P1, P2, P1]. In contrast, the states at odd columns and even columns after four columns are [P2, P1, P2, P1].

TABLE 1

NR + 1 = 1     ↓ NC

| S | S | S | S | $P_2$ | $P_2$ | $P_2$ | $P_2$ | ... |
|---|---|---|---|---|---|---|---|---|
| $P_2$ | $P_1$ | $P_2$ | $P_1$ | $P_1$ | $P_1$ | $P_1$ | $P_1$ | ... |
| $P_1$ | $P_2$ | $P_1$ | $P_2$ | $P_2$ | $P_2$ | $P_2$ | $P_2$ | |
| $P_2$ | $P_1$ | $P_2$ | $P_1$ | $P_1$ | $P_1$ | $P_1$ | $P_1$ | |

ColCnt →

The following table 2 shows a case in which the NR+1 is 1 and the NC is an odd (NC[0]=1). That is, table 2 shows a case in which the NR is 0 and the NC is 5. In table 2, the states of the systematic bit, the parity bit 1 and the parity bit 2 at the ColCnt<NC-1 and the ColCnt[0]=0 are [S, P2, P1, P2]. Further, the states of the systematic bit, the parity bit 1 and the parity bit 2 at the ColCnt<NC-1 and the ColCnt[0]=1 (even column) are [S, P1, P2, P1]. In contrast, the states of the systematic bit, the parity bit 1 and the parity bit 2 at the ColCnt>NC-1 and the ColCnt[0]=0 are [P1, P2, P1, P2] and the states of the systematic bit, the parity bit 1 and the parity bit 2 at the ColCnt>NC-1 and the ColCnt[0]=1 are [P1, P2, P1, P2].

That is, the states at odd columns in five columns are [S, P2, P1, P2] and the states at even columns in four columns are [S, P1, P2, P1]. In contrast, the states at odd columns and even columns after five columns are [P1, P2, P1, P2].

TABLE 2

NR + 1 = 1     ↓ NC

| S | S | S | S | S | $P_1$ | $P_1$ | $P_1$ | |
|---|---|---|---|---|---|---|---|---|
| $P_2$ | $P_1$ | $P_2$ | $P_1$ | $P_2$ | $P_2$ | $P_2$ | $P_2$ | ... |
| $P_1$ | $P_2$ | $P_1$ | $P_2$ | $P_1$ | $P_1$ | $P_1$ | $P_1$ | |
| $P_2$ | $P_1$ | $P_2$ | $P_1$ | $P_2$ | $P_2$ | $P_2$ | $P_2$ | |

The following table 3 shows a case in which the NR+1 is 2 and the NC is an even (NC[0]=0). That is, table 3 shows a case in which the NR is 1 and the NC is 4. In table 3, the states of the systematic bit, the parity bit 1 and the parity bit 2 at the ColCnt<NC-1 and the ColCnt[0]=0 are [S, S, P2, P1]. Further, the states of the systematic bit, the parity bit 1 and the parity bit 2 at the ColCnt<NC-1 and the ColCnt[0]=1 are [S, S, P2, P1]. In contrast, the states of the systematic bit, the parity bit 1 and the parity bit 2 at the ColCnt>NC-1 and the ColCnt[0]=0 are [S, P2, P1, P2] and the states of the systematic bit, the parity bit 1 and the parity bit 2 at the ColCnt>NC-1 and the ColCnt[0]=1 are [S, P1, P2, P1]. That is, the states at odd columns and even columns in four columns are [S, S, P2, P1]. In contrast, the states at odd columns after four columns are [S, P2, P1, P2] and the states at even columns after four columns are [S, P1, P2, P1]

TABLE 3

NR + 1 = 2     ↓ NC

| S | S | S | S | S | S | S | S | S | S |
|---|---|---|---|---|---|---|---|---|---|
| S | S | S | S | $P_2$ | $P_1$ | $P_2$ | $P_1$ | | |
| $P_2$ | $P_2$ | $P_2$ | $P_2$ | $P_1$ | $P_2$ | $P_1$ | $P_2$ | ... | |
| $P_1$ | $P_1$ | $P_1$ | $P_1$ | $P_2$ | $P_1$ | $P_2$ | $P_1$ | | |

The following table 4 shows a case in which the NR+1 is 2 and the NC is an odd (NC[0]=1). That is, table 4 shows a case in which the NR is 1 and the NC is 5. In table 4, the states of the systematic bit, the parity bit 1 and the parity bit 2 at the ColCnt<NC-1 and the ColCnt[0]=0 are [S, S, P2, P1]. Further, the states of the systematic bit, the parity bit 1 and the parity bit 2 at the ColCnt<NC-1 and the ColCnt[0]=1 are [S, S, P2, P1]. In contrast, the states of the systematic bit, the parity bit 1 and the parity bit 2 at the ColCnt>NC-1 and the ColCnt[0]=0 are [S, P2, P1, P2] and the states of the systematic bit, the parity bit 1 and the parity bit 2 at the ColCnt>NC-1 and the ColCnt[0]=1 are [S, P1, P2, P1].

That is, the states at odd columns and even columns in five columns are [S, S, P2, P1]. In contrast, the states at odd columns after five columns are [S, P2, P1, P2] and the states at even columns after five columns are [S, P1, P2, P1]

TABLE 4

NR + 1 = 2 ↓ NC

| S | S | S | S | S | S | S | S | S | S |
|---|---|---|---|---|---|---|---|---|---|
| S | S | S | S | S | P₂ | P₁ | P₂ | | |
| P₂ | P₂ | P₂ | P₂ | P₂ | P₁ | P₂ | P₁ | ... | |
| P₁ | P₁ | P₁ | P₁ | P₁ | P₂ | P₁ | P₂ | | |

The following table 5 shows a case in which the NR+1 is 3 and the NC is an even (NC[0]=0). That is, table 5 shows a case in which the NR is 2 and the NC is 4. In table 5, the states of the systematic bit, the parity bit 1 and the parity bit 2 at the ColCnt<NC-1 and the ColCnt[0]=0 are [S, S, S, P2]. Further, the states of the systematic bit, the parity bit 1 and the parity bit 2 at the ColCnt<NC-1 and the ColCnt[0]=1 are [S, S, S, P1]. In contrast, the states of the systematic bit, the parity bit 1 and the parity bit 2 at the ColCnt>NC-1 and the ColCnt[0]=0 are [S, S, P2, P1] and the states of the systematic bit, the parity bit 1 and the parity bit 2 at the ColCnt>NC-1 and the ColCnt[0]=1 are [S, S, P2, P1].

That is, the states at odd columns in four columns are [S, S, S, P2] and the states at even columns in four columns are [S, S, S, P1]. In contrast, the states at odd columns and even columns after four columns are [S, S, P2, P1].

TABLE 5

NR + 1 = 3 ↓ NC

| S | S | S | S | S | S | S | S | S | S |
|---|---|---|---|---|---|---|---|---|---|
| S | S | S | S | S | S | S | S | S | S |
| S | S | S | S | P₂ | P₂ | P₂ | P₂ | ... | |
| P₂ | P₁ | P₂ | P₁ | P₁ | P₁ | P₁ | P₁ | | |

The following table 6 shows a case in which the NR+1 is 3 and the NC is an odd (NC[0]=1). That is, table 6 shows a case in which the NR is 2 and the NC is 5. In table 6, the states of the systematic bit, the parity bit 1 and the parity bit 2 at the ColCnt<NC-1 and the ColCnt[0]=0 are [S, S, S, P2]. Further, the states of the systematic bit, the parity bit 1 and the parity bit 2 at the ColCnt<NC-1 and the ColCnt[0]=1 are [S, S, S, P1]. In contrast, the states of the systematic bit, the parity bit 1 and the parity bit 2 at the ColCnt>NC-1 and the ColCnt[0]=0 are [S, S, P1, P2] and the states of the systematic bit, the parity bit 1 and the parity bit 2 at the ColCnt>NC-1 and the ColCnt[0]=1 are [S, S, P1, P2].

That is, the states at odd columns in five columns are [S, S, S, P2] and the states at even columns in five columns are [S, S, S, P1]. In contrast, the states at odd columns and even columns after five columns are [S, S, P1, P2].

TABLE 6

NR + 1 = 3 ↓ NC

| S | S | S | S | S | S | S | S | S |
|---|---|---|---|---|---|---|---|---|
| S | S | S | S | S | S | S | S | S |
| S | S | S | S | S | P₁ | P₁ | P₁ | ... |
| P₂ | P₁ | P₂ | P₁ | P₂ | P₂ | P₂ | P₂ | |

The following table 7 shows a case in which the NR+1 is 4 and the NC is an even (NC[0]=0). That is, table 7 shows a case in which the NR is 3 and the NC is 4. In table 7, the states of the systematic bit, the parity bit 1 and the parity bit 2 at the ColCnt<NC-1 and the ColCnt[0]=0 are [S, S, S, S]. Further, the states of the systematic bit, the parity bit 1 and the parity bit 2 at the ColCnt<NC-1 and the ColCnt[0]=1 are [S, S, S, S]. In contrast, the states of the systematic bit, the parity bit 1 and the parity bit 2 at the ColCnt>NC-1 and the ColCnt[0]=0 are [S, S, S, P2] and the states of the systematic bit, the parity bit 1 and the parity bit 2 at the ColCnt>NC-1 and the ColCnt[0]=1 are [S, S, S, P1].

That is, the states at odd columns and even columns in four columns are [S, S, S, S]. In contrast, the states at odd columns after four columns are [S, S, S, P2] and the states at even columns after four columns are [S, S, S, 1].

TABLE 7

NR + 1 = 4 ↓ NC

| S | S | S | S | S | S | S | S | S | S |
|---|---|---|---|---|---|---|---|---|---|
| S | S | S | S | S | S | S | S | S | S |
| S | S | S | S | S | S | S | S | S | S |
| S | S | S | S | P₂ | P₁ | P₂ | P₁ | ... | |

The following table 8 shows a case in which the NR+1 is 4 and the NC is an odd (NC[0]=1). That is, table 8 shows a case in which the NR is 3 and the NC is 5.

TABLE 8

NR + 1 = 4 ↓ NC

| S | S | S | S | S | S | S | S | S |
|---|---|---|---|---|---|---|---|---|
| S | S | S | S | S | S | S | S | S |
| S | S | S | S | S | S | S | S | S |
| S | S | S | S | S | P₂ | P₁ | P₂ | ... |

In table 8, the states of the systematic bit, the parity bit 1 and the parity bit 2 at the ColCnt<NC-1 and the ColCnt[0]=0 are [S, S, S, S]. Further, the states of the systematic bit, the parity bit 1 and the parity bit 2 at the ColCnt<NC-1 and ColCnt[0]=1 are [S, S, S, S]. In contrast, the states of the systematic bit, the parity bit 1 and the parity bit 2 at the ColCnt>NC-1 and the ColCnt[0]=0 are [S, S, S, P2] and the states of the systematic bit, the parity bit 1 and the parity bit 2 at the ColCnt>NC-1 and the ColCnt[0]=1 are [S, S, S, P1].

That is, the states at odd columns and even columns in five columns are [S, S, S, S]. In contrast, the states at odd columns after five columns are [S, S, S, P2] and the states at even columns after five columns are [S, S, S, P1].

The following tables 9, 10, 11 and 12 show cases in which the NC is zero. Herein, the state of each column changes depending on the NR value and whether the current column is an odd column or an even column.

The table 9 shows a case in which the NR is 1. Further, the states of the systematic bit, the parity bit 1 and the parity bit 2 have a value of [S, P2, P1, P2] or [S, P1, P2, P1] according to whether the current column is the odd column or the even column.

TABLE 9

NR = 1, NC →

| S | S | S | S | S | S | S | S | S | S |
|---|---|---|---|---|---|---|---|---|---|
| P2 | P1 | P2 | P1 | P2 | P1 | P2 | P1 | | |
| P1 | P2 | P1 | P2 | P1 | P2 | P1 | P2 | ... | |
| P2 | P1 | P2 | P1 | P2 | P1 | P2 | P1 | | |

The following table 10 shows a case in which the NR is 2. Further, the states at odd columns and even columns are [S, S, P2, P1].

TABLE 10

NR = 2, NC →

| S | S | S | S | S | S | S | S | S | S |
|---|---|---|---|---|---|---|---|---|---|
| S | S | S | S | S | S | S | S | S | S |
| P2 | P2 | P2 | P2 | P2 | P2 | P2 | P2 | | |
| P1 | P1 | P1 | P1 | P1 | P1 | P1 | P1 | ... | |

The following table 11 shows a case in which the NR is 3. When the current column is the odd column, the states of the systematic bit, the parity bit 1 and the parity bit 2 are [S, S, S, P2]. In contrast, when the current column is the even column, the states of the systematic bit, the parity bit 1 and the parity bit 2 are [S, S, S, P1].

TABLE 11

NR = 3, NC →

| S | S | S | S | S | S | S | S | S | S |
|---|---|---|---|---|---|---|---|---|---|
| S | S | S | S | S | S | S | S | S | S |
| S | S | S | S | S | S | S | S | S | S |
| P2 | P1 | P2 | P1 | P2 | P1 | P2 | P1 | ... | |

The following table 12 shows a case in which the NR is 4. Further, the states at odd columns and even columns are [S, S, S, S].

TABLE 12

NR = 4, NC →

| S | S | S | S | S | S | S | S | S | S |
|---|---|---|---|---|---|---|---|---|---|
| S | S | S | S | S | S | S | S | S | S |
| S | S | S | S | S | S | S | S | S | S |
| S | S | S | S | S | S | S | S | S | S |

As described above, FIG. 6 shows a case in which the states changed by the parameters NR, NC and ColCnt of the systematic bit, the parity bit 1 and the parity bit 2 are output by the column. According to the rule as shown in FIG. 6, the state sequences in which the systematic bit, the parity bit 1 and the parity bit 2 are distinguished from each other are stored in the bit de-collection buffer by the column.

Accordingly, the read address generator 505 of the present invention does not have the necessity of including separate registers for storing the read addresses of the systematic bit, the parity bit 1 and the parity bit 2 in performing the read operation.

Figure 7A:
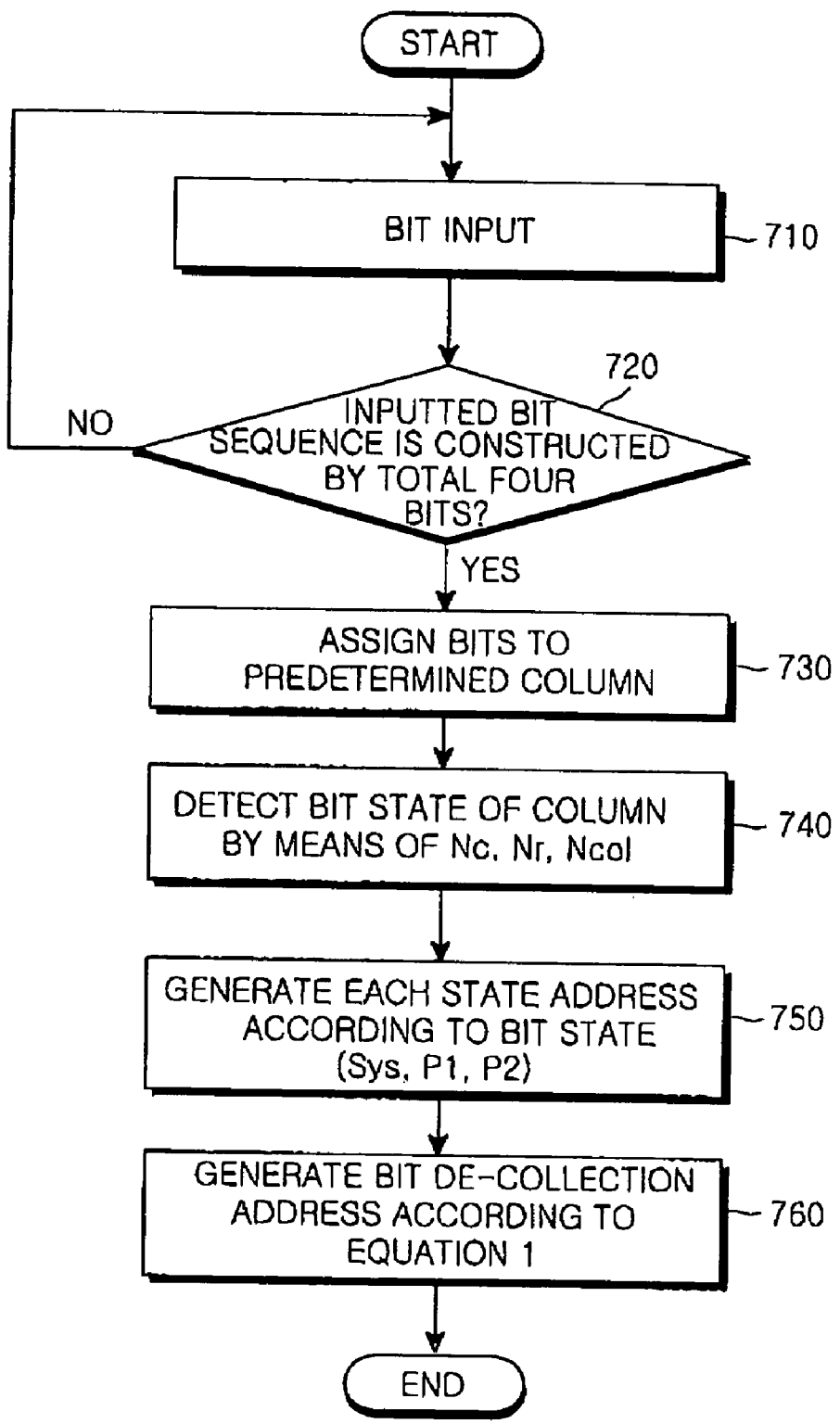
FIG. 7A is a flow diagram illustrating a process by which a write operation is performed for a bit de-collection buffer according to an embodiment of the present invention.

FIG. 7A is a flow diagram illustrating a process by which a write operation is performed for the bit de-collection buffer by the column according to an embodiment of the present invention.

Referring to FIG. 7A, the column counter 501 of the bit de-collection block continuously inputs a received bit sequence in step 710 and checks whether the input bit sequence is constructed by the total four bits or not in step 720. As a result of the check in step 720, when the input bit sequence is constructed by the total four bits, step 730 is performed. That is, the column counter 501 assigns the four bits to a predetermined column. In other words, the column counter 501 receives the input bit sequences and assigns one column each four bits in step 730. In step 740, the state detector 510 detects a state of each bit assigned to each corresponding column by means of applied parameters NC, NR and NCOL and a modulation scheme. That is, as shown in FIG. 6, the state detector 510 checks the systematic bit, the parity bit 1 and the parity bit 2 assigned to the corresponding column through the parameters NC, NR and NCOL. In step 750, the write address generator 503 generates the address of a corresponding bit according to the numbers of the detected systematic bits, parity bits 1 and parity bits 2. Then, in step 760, the write address generator 503 applies the generated address of the corresponding bit to equation 1 and generates addresses of the bit de-collection buffer. That is, the write address generator 503 generates the addresses of the corresponding bits according to the number of bits output from the state detector 510, applies the address of each generated bit to equation 1 and generates the addresses of the bit de-collection buffer.

Figure 7B:
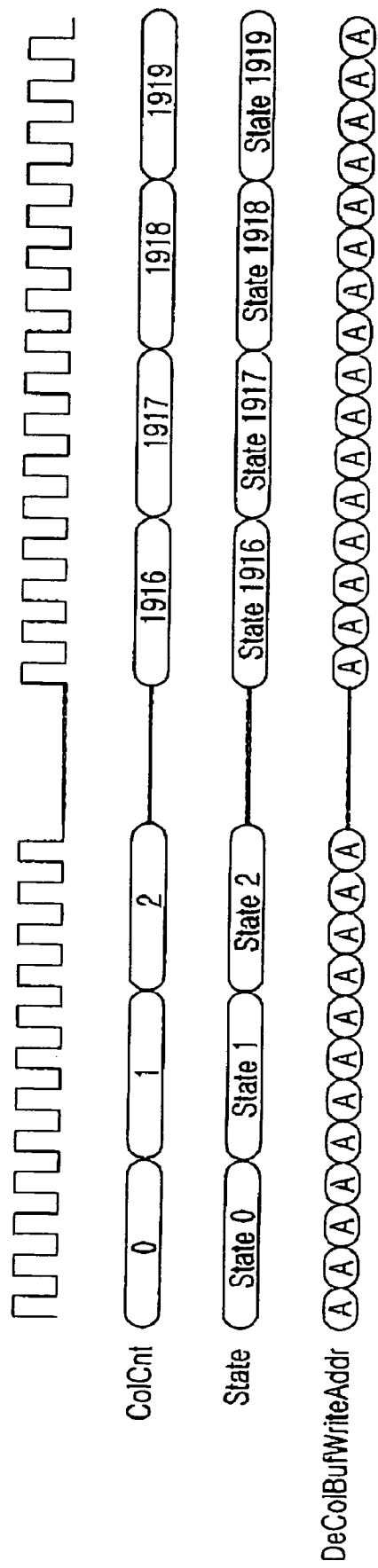
FIG. 7B is a diagram illustrating of bits for which a write operation is performed by the column according to an embodiment of the present invention.

FIG. 7B is a diagram showing states of bits for which a write operation is performed by the column according to an embodiment of the present invention.

Referring to FIG. 7B, the state detector 510 inputs the received bit sequences and outputs a state of each bit sequence by means of the applied parameters NC, NR and NCOL and the modulation scheme. Further, the write address generator 503 generates addresses based on the write operation in the bit de-collection block in consideration of the states of the output bits. That is, the state detector 510 differentiates the states of a systematic bit, a parity bit 1 and a parity bit 2 of each column through the parameters NC and NR and assigns the states to the initial address of the bit de-collection buffer. Herein, when a bit sequence assigned to one column is constructed by four bits, increases the parameter ConCnt, and assigns the write addresses of the corresponding systematic bit, parity bit 1 and parity bit 2 to the next column.

That is, four bits including the systematic bit, the parity bit 1 and the parity bit 2, which are equal to or different from each other according to the parameters NC, NR and NCOL, exist in each column, and the addresses of the bit de-collection buffer are generated according to the state of each bit.

Meanwhile, in a read operation, the read address generator 505 performs a read operation while sequentially increasing the systematic bit, the parity bit 1 and the parity bit 2 sequentially stored in the bit de-collection buffer. Accordingly, the present invention does not have the necessity of including separate registers for storing read addresses in performing the read operation.

Figure 8:
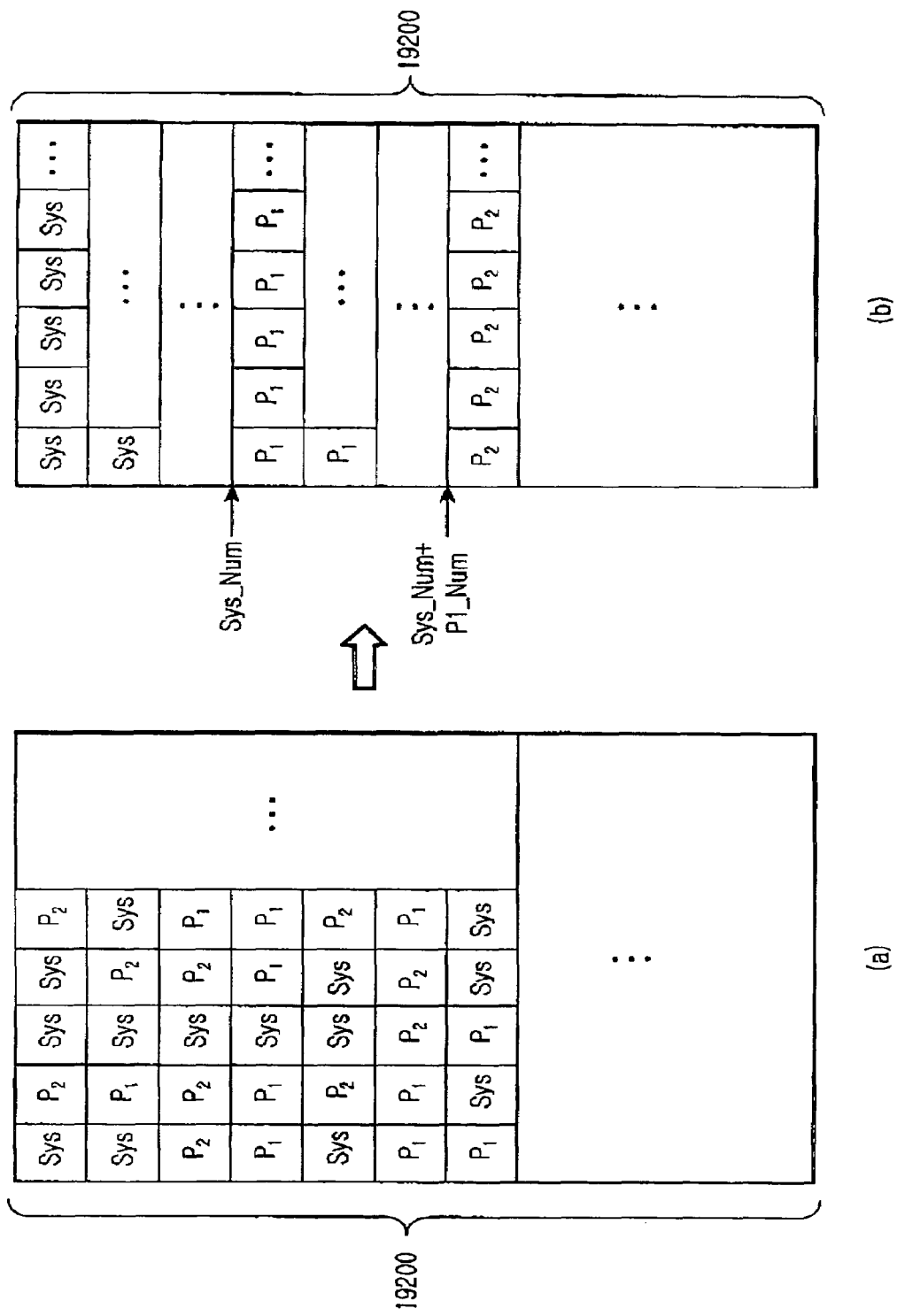
FIG. 8 is a diagram illustrating the structure of a de-collection buffer according to an embodiment of the present invention and the structure of the bit de-collection buffer according to the prior art.

FIG. 8 is a diagram illustrating the structure of the bit de-collection buffer according to an embodiment of the present invention and the structure of the bit de-collection buffer according to the prior art.

Referring to FIG. 8, (a) of FIG. 8 shows the state of each bit stored in the bit de-collection buffer according to the prior art and (b) of FIG. 8 shows the state of each bit stored in the bit de-collection buffer according to an embodiment of the present invention.

Figure 1:
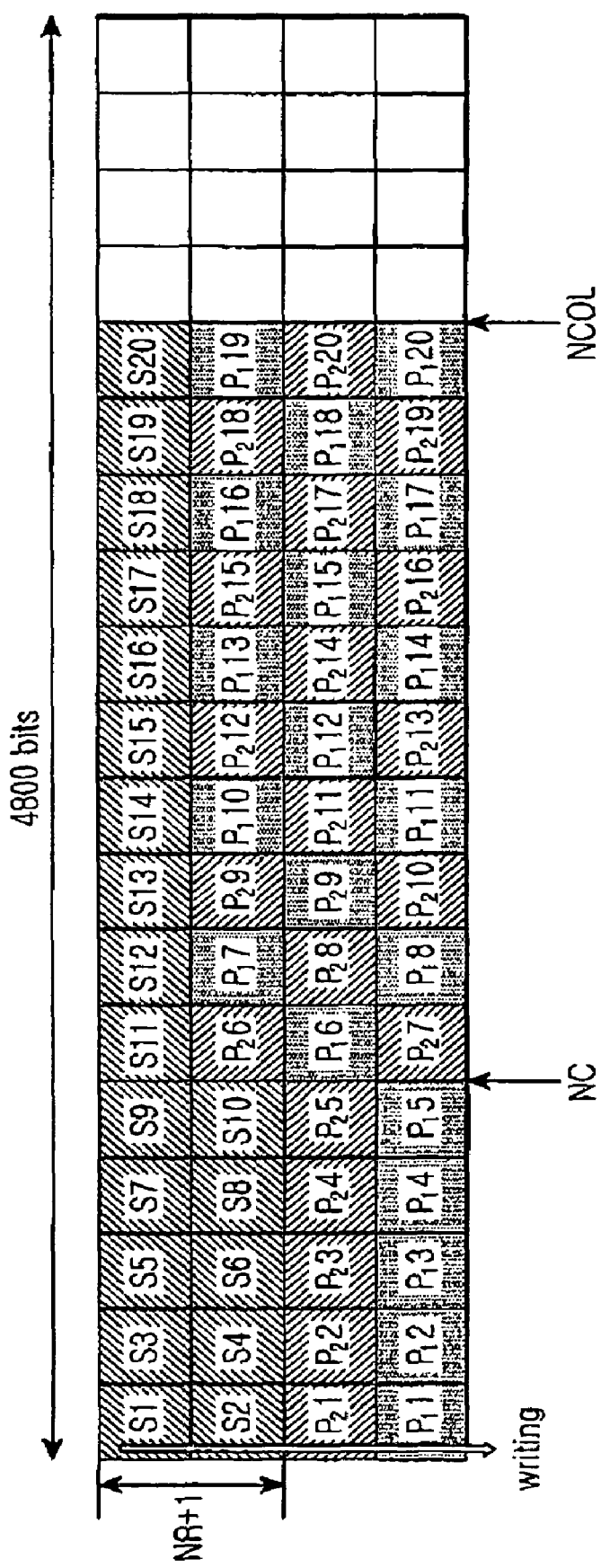
FIG. 1 is a diagram illustrating the structure of a conventional bit de-collection buffer.
Figure 2:
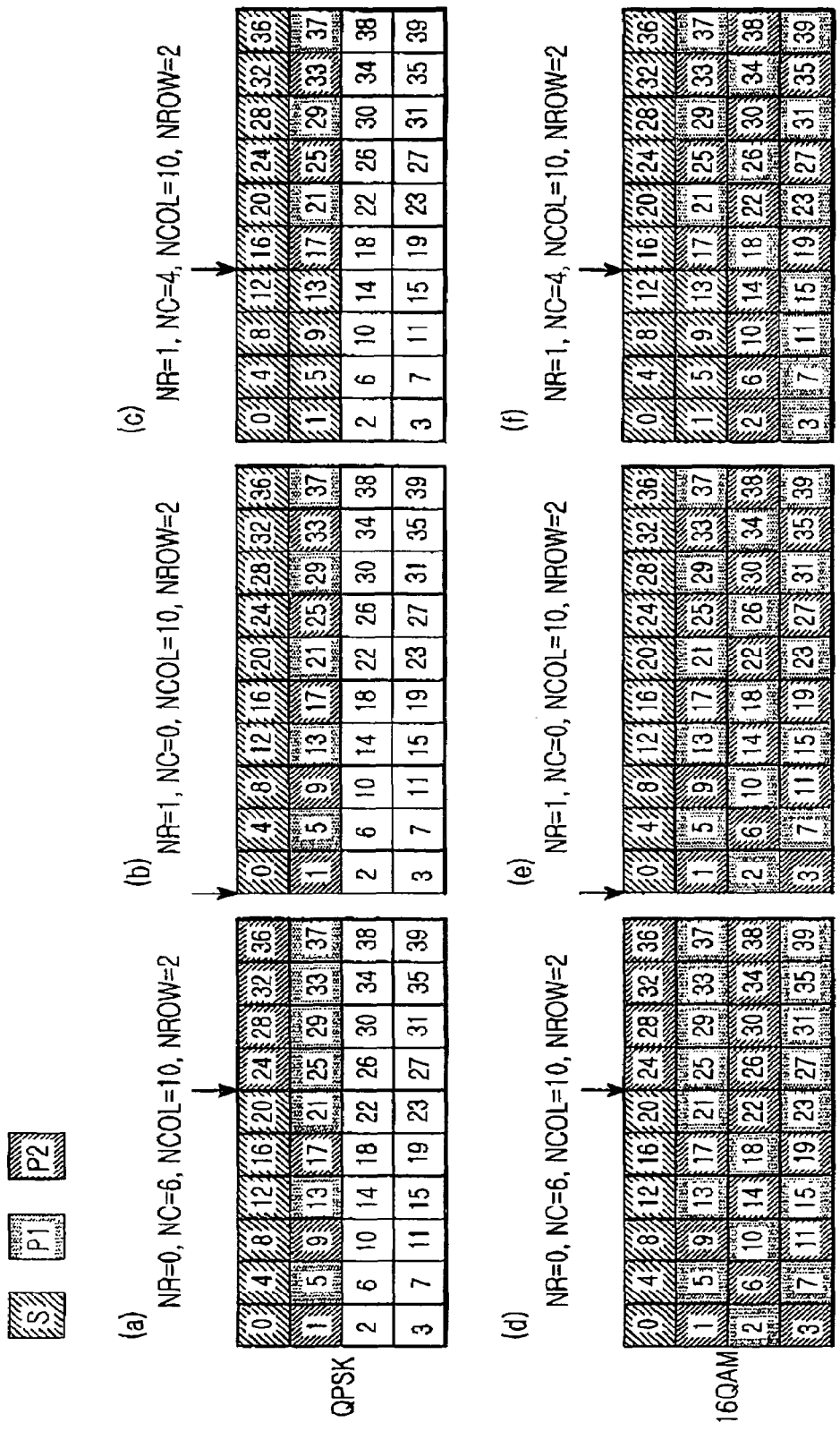
FIG. 2 is a diagram illustrating a conventional process by which systematic bits, parity bits 1 and parity bits 2 are assigned to a bit de-collection buffer.
Figure 3:
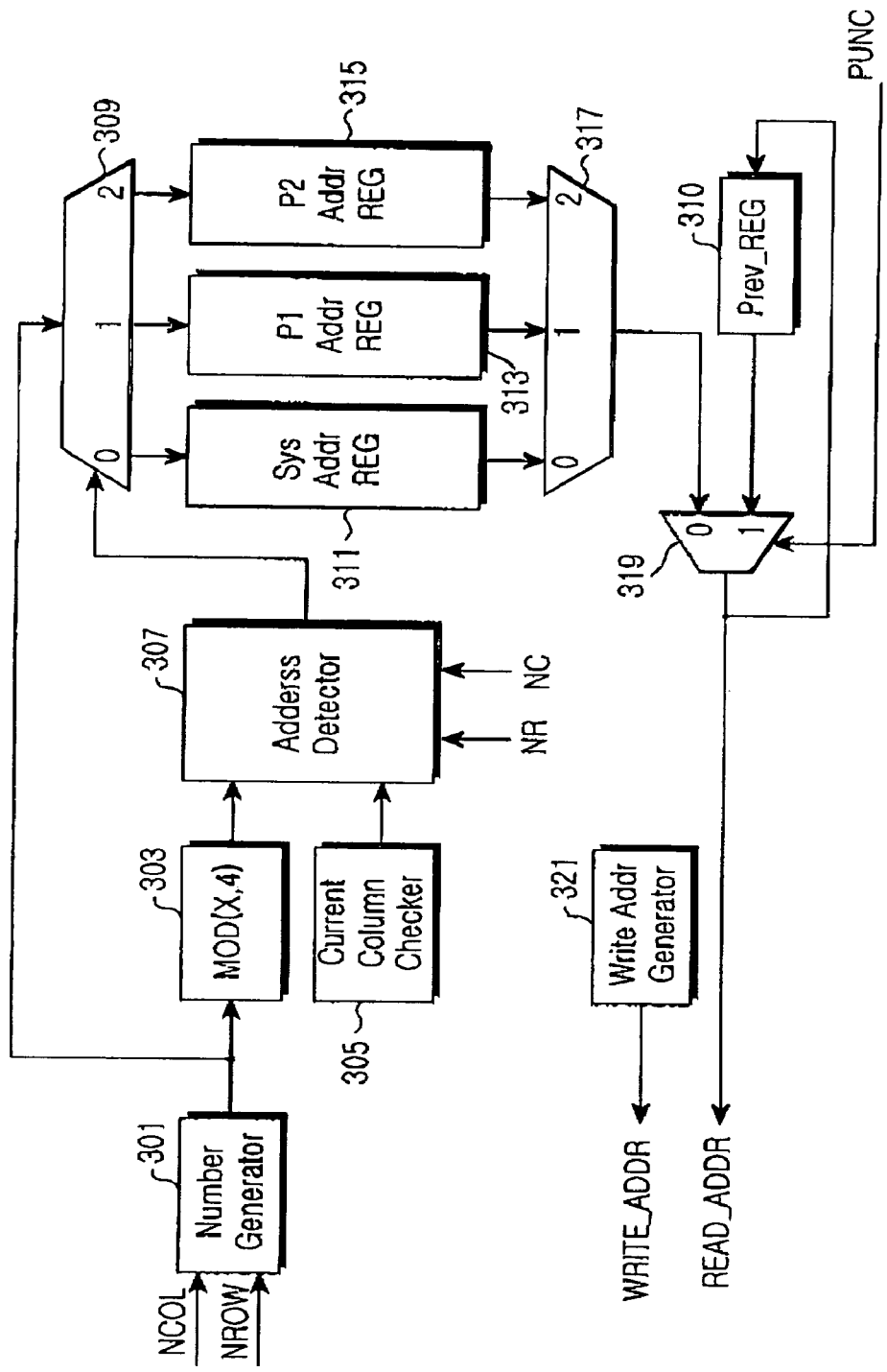
FIG. 3 is a block diagram showing the structure of a conventional address generator performing a write/read process for a bit de-collection buffer.

In (a) of FIG. 8, the systematic bit, the parity bit 1 and the parity bit 2 are scattered and stored in the conventional bit de-collection buffer. Accordingly, in order to perform a read operation, a bit de-collection block includes separate registers for storing the address of each bit stored in bit de-collection buffer. That is, the bit de-collection block includes the register (311 of FIG. 3) for storing the addresses of the systematic bits, the register (313 of FIG. 3) for storing the addresses of the parity bits 1, and the register (315 of FIG. 3) for storing the addresses of the parity bits 2.

In contrast, in (b) of FIG. 8, the systematic bit, the parity bit 1 and the parity bit 2 are differentiated from each other and stored in the bit de-collection buffer according to the present invention. That is, the bit de-collection block according to the present invention stores the parity bit 1 with offsets corresponding to the number of the systematic bits and stores the parity bit 2 with offsets corresponding to sum of the number of the systematic bits and the number of the parity bits 1. This is as expressed in equation 1.

Accordingly, the bit de-collection block has the write addresses and the read addresses equal to each other. Therefore, the bit de-collection block does not includes separate registers for storing the addresses of each bit according to the read operation.

In the embodiment of the present invention operating as described above, when systematic bits, parity bits 1 and parity bits 2 are stored in a bit de-collection buffer by the column, read addresses are generated according to the rule as shown in FIG. 6. Therefore, the embodiment of the present invention does not have the necessity of separately including 19200 registers of 15 bits necessary for differentiating the addresses of the systematic bits, the parity bits 1 and the parity bits 2 in a read operation. Accordingly, the size of hardware is reduced. Furthermore, the efficiency of entire system power can be maximized due to the reduction in the size of the hardware.

Although a certain embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. An apparatus for performing a bit de-collection in a communication system using a high speed downlink packet access scheme, the apparatus comprising:
a column counter for increasing one column every four bits and outputting a parameter of a current column, detecting that the current column is an odd column or an even column;
a state detector for outputting state information of the current column by means of the parameter of the current column of the column counter, a row parameter denoting a number of rows to which systematic bits have been assigned, and a column parameter denoting a number of columns to which the systematic bits have been assigned; and
address generators for generating an address for writing operation and reading operation according to the state information outputted from the state detector.

2. The apparatus as claimed in claim 1, wherein the state detector includes an adder/comparator and a state generator,
the adder/comparator for detecting that the current column is an odd column or an even column by comparing the parameter of the current column with the column parameter-1, and calculating each writing address that a systematic bit, a first parity bit or a second parity bit is to be assigned using the value of the current column, the row parameter and the column parameter and;
the state generator generating the state information of the current column according to the result calculated from the adder/comparator.

3. The apparatus as claimed in claim 2, wherein the adder/comparator further detects that the current column is an odd column or an even column by comparing the parameter of the current column with the column parameter-1, and calculating each reading address that a systematic bit, a parity bit 1 or a parity bit 2 is assigned using the value of the current column, the row parameter and the column parameter.

4. The apparatus as claimed in claim 1, wherein the address generator sets a writing address of a systematic bit, to an address for a systematic bit in a buffer performing the bit de-collection when the state information outputted from the state detector is the systematic bit.

5. The apparatus as claimed in claim 4, wherein, when the state information outputted from the state detector is a first parity bit of parity bits, the address generator sets a writing address of a first parity bit added with the number of systematic bits, to an address for the first parity bit in the buffer.

6. The apparatus as claimed in claim 5, wherein, when the state information outputted from the state detector is a second parity bit of the parity bits, the address generator sets a writing address of a second parity bit added with the number of the first parity bits and the number of systematic bits, to an address for the second parity bit in the buffer.

7. The apparatus as claimed in claim 4, wherein the address generator wherein the address generator sets a writing address of a systematic bit, to an initial writing address for the buffer when the initial state information outputted from the state detector is the systematic bit.

8. A method for performing a bit de-collection in a communication system using a high speed downlink packet access scheme, the method comprising the steps of:

inputting received bit sequences, increasing one column every four bits, and outputting a parameter denoting whether the column is an odd column or an even column;

detecting state information of a corresponding column by means of the parameter denoting whether the current column is the odd column or the even column, a parameter denoting a number of rows to which systematic bits have been assigned, and a parameter denoting a number of columns to which the systematic bits have been assigned; and generating address for writing operation and reading operation according to the detected state information.

9. The method as claimed in claim 8, further comprising a step of detecting that the current column is an odd column or an even column by comparing the parameter of the column with the column parameter-1 and;

calculating each writing address that a systematic bit, a first parity bit or a second parity bit is to be assigned using the value of the current column, the row parameter and the column parameter and; generating the 4 bits state information of the current column according to the result calculated.

10. The method as claimed in claim 9, further comprising a step of setting a writing address of an systematic bit, to an address for a systematic bit in a buffer performing the bit de-collection when the detected state information is the systematic bit.

11. The method as claimed in claim 10, further comprising a step of, when the state information outputted from the state detector is a first parity bit of parity bits, the address generator sets a writing address of a first parity bit added with the number of systematic bits, to an address for the first parity bit in the buffer.

12. The method as claimed in claim 11, further comprising a step of, when the state information outputted from the state detector is a second parity bit of the parity bits, the address generator sets a writing address of a second parity bit added with the number of the first parity bits and the number of systematic bits, to a address for the second parity bit in the buffer.

13. The method as claimed in claim 9, further comprising a step of detecting that the current column is an odd column or an even column by comparing the parameter of the column with the column parameter-1, and calculating each reading address that a systematic bit, a first parity bit or a second parity bit is to be assigned using the value of the current column, the row parameter and the column parameter and; generating the 4 bits state information of the current column according to the result calculated.

14. An apparatus for performing a bit de-collection in a communication system using a high speed downlink packet access scheme, the apparatus comprising:

a column counter for inputting received bit sequences and analyzing a position of a current column;

a state detector for judging systematic bits and parity bits by means of a result obtained by analyzing the position of the current column, a parameter denoting a number of rows to which the systematic bits have been assigned, and a parameter denoting a number of columns to which the systematic bits have been assigned; and address generators for generating write addresses and read addresses according to an output value of the state detector.

15. A method for performing a bit de-collection in a communication system using a high speed downlink packet access scheme, the method comprising the steps of:

determining whether received bits are information bits or parity bits;

sequentially generating addresses to be assigned when the received bits are the information bits; and sequentially generating the addresses to be assigned in consideration of a number of the information bits when the received bits are the parity bits, wherein addresses to be assigned to bits of a second parity bit sequence are sequentially generated in consideration of the number of the information bits and a number of bits of a first parity bit sequence when the received parity bits forms a plurality of parity bit sequences.

* * * * *